(12) United States Patent
González Moreno

(10) Patent No.: US 8,242,424 B2
(45) Date of Patent: Aug. 14, 2012

(54) SINGLE AXIS SOLAR TRACKER

(75) Inventor: José Abel González Moreno, Fustiñana (ES)

(73) Assignee: Mecanizados Solares, S.L., Fustinana (Navarra) (ES)

(*) Notice: Subject to any disclaimer, the term of this patent is extended or adjusted under 35 U.S.C. 154(b) by 248 days.

(21) Appl. No.: 12/605,173

(22) Filed: Oct. 23, 2009

(65) Prior Publication Data
US 2010/0263710 A1 Oct. 21, 2010

(30) Foreign Application Priority Data
Apr. 21, 2009 (ES) .................................. 200901032

(51) Int. Cl.
*G01C 21/02* (2006.01)
*H02N 6/00* (2006.01)
*F24J 2/38* (2006.01)
(52) U.S. Cl. ...................... 250/203.4; 136/246; 126/573
(58) Field of Classification Search .............. 250/203.4; 136/246, 244, 251, 259; 126/573, 600, 575, 126/576, 605, 684
See application file for complete search history.

(56) References Cited

U.S. PATENT DOCUMENTS

| 4,649,899 A | 3/1987 | Moore |
| 6,563,040 B2 * | 5/2003 | Hayden et al. ................ 136/244 |
| 2009/0320826 A1 * | 12/2009 | Kufner .......................... 126/573 |

FOREIGN PATENT DOCUMENTS

| DE | 10343374 A1 | 12/2004 | |
| EP | 2015369 | 1/2009 | |
| ES | 2107960 A1 | 12/1997 | |
| ES | 2281990 A1 | 10/2007 | |
| WO | 2007090908 A1 | 8/2007 | |
| WO | WO2008155652 | * 6/2008 | ...................... 31/42 |
| WO | 2008155652 A2 | 12/2008 | |

* cited by examiner

*Primary Examiner* — Georgia Y Epps
*Assistant Examiner* — Don Williams
(74) *Attorney, Agent, or Firm* — Lucas & Mercanti, LLP

(57) ABSTRACT

The invention relates to a single-axis solar tracker formed by a support structure (2) which is supported in a rotating assembly with respect to a vertical axis on a base (7), a bearing structure (3) for a solar panel being assembled on said support structure (2) by means of horizontal articulations (4), with the inclusion between said structures (2 and 3) of ties (5) which can be longitudinally regulated, by means of which the inclination of the bearing structure (3) for the solar panel can be relatively varied.

3 Claims, 4 Drawing Sheets

SINGLE AXIS SOLAR TRACKER

CROSS REFERENCE TO RELATED APPLICATIONS

This Application claims the benefit of priority of Spanish Patent Application No.: 200901032 filed Apr. 21, 2009 the entire contents of which are hereby incorporated by reference.

FIELD OF THE ART

The object of the present invention relates to the mobile mechanisms incorporated in photovoltaic-type solar panels or the like, and which are capable of being oriented with respect to the sun to improve the use of the incidence of rays of sunlight on the surface of the solar panels, proposing an apparatus of this type with an embodiment providing particularly advantageous constructive and functional features.

STATE OF THE ART

Technological orientation is increasingly tending towards using renewable energies, such as solar energy and wind energy, for the production of consumable energies, such as electric energy or heat energy.

In this sense, a capture of solar radiation is required for the conversion of solar energy into energies for consumption, bearing structures for panels formed by solar radiation-capturing plates being used to that end.

There are fixed solutions of said bearing structures for the solar panels, in which the solar panel is fixedly arranged in an inclined position calculated to use the incidence of the sun in the best conditions.

However, given that the position of the sun changes through the day and in a different manner during the different seasons of the year, said fixed solutions have the drawback that the use of the solar incidence is deficient.

Furthermore, since the variation of the position of the sun is also different according to the geographic areas, the inclination position of the solar panels must be different depending on the geographic area in which they are arranged, specific bearing structures being required for each case.

Mobile structures have been developed to use solar energy more efficiently, by means of which the solar panels are supported in a position-changing manner tracking the position of the sun, using automatic drive means programmed according to the movement of the sun, such that the solar panels are maintained constantly oriented towards the sun, thus optimizing the capture of solar radiation.

In such sense, there are mobile structures arranged in a rotating movement assembly with respect to a vertical axis, on a seating base, on which a solar panel is arranged in a fixed inclined position. With this solution sun tracking is achieved which allows improving the use of solar radiation with respect to the fixed arrangement solutions, but since the sun tracking is only in the azimuth direction, the position remaining fixed in the zenith direction, the use of the solar radiation is not complete; and given that the height position of the sun's path varies among geographic areas, it is necessary to build structures with a specific inclination for each area of application and, even so, the variations of the sun's path in the different seasons of the year make the conditions of use of solar radiation change among seasons.

There are also solutions of bearing structures for the solar panels with a drive of a double combined movement in the azimuth direction and in the zenith direction, whereby the use of solar radiation is optimized, but these solutions require very complex drive mechanisms and operation controls, which make the installations very expensive, in terms of both assembly and maintenance.

OBJECT OF THE INVENTION

According to the invention, a solar tracker is proposed which is developed according to constructive and functional features making its embodiment advantageous in relation to known solutions of this type of apparatus.

This solar tracker object of the invention consists of a structural assembly formed by a support structure, on which a bearing structure for a solar panel is attached, the support structure being arranged in a rotating assembly with respect to a vertical axis on a support base, whereas the bearing structure for the solar panel is arranged on said support structure in an assembly articulated by means of horizontal articulations, ties which can be longitudinally regulated being included between both structures.

An assembly is thus obtained which, by means of an automatic drive of the rotation an the support base, allows the movement of the supported solar panel, tracking the movement of the sun in the azimuth direction, whereas the inclination position of the solar panel can be varied by regulating the length of the ties included between the support structure and the bearing structure for the solar panel, such that by means of said regulation the position of the solar panel can be adapted to the optimal inclination required in the installation site, and the inclination in the different seasons of the year can be corrected as well, in order to optimize the function of the solar tracker in the circumstances of each season.

A solar tracker is thus obtained which has the advantage of the simplicity and reduced cost of the structural arrangements supporting solar panels in a fixed manner, providing at the same time the functional advantage of the use of solar radiation by means of tracking the position of the sun in more effective conditions than those of known embodiments of solar trackers with movement in a single axis, but without the complexity involved in the embodiment of solar trackers with combined automatic movements in two directions.

DETAILED DESCRIPTION OF THE INVENTION

Figure 1:
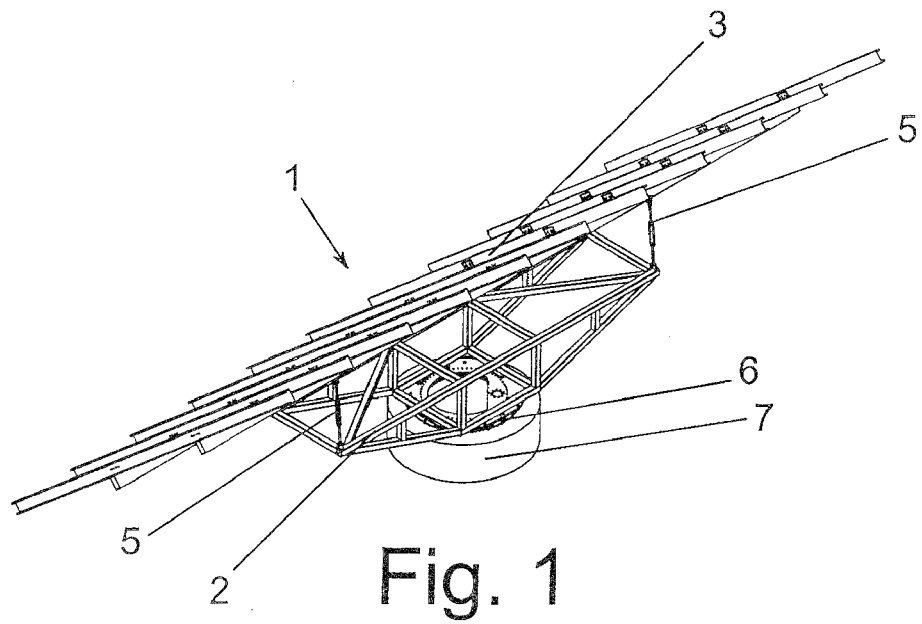
FIG. 1 shows a perspective view of an embodiment of the solar tracker object of the invention with two ties regulating the inclination of the solar panel.

The object of the invention relates to a solar tracker intended for capturing solar incidence, with tracking of the movement of the sun in the azimuth direction and selective regulation of the inclination position of the corresponding solar panel.

Said solar panel comprises a structural assembly (1) consisting of a support structure (2), on which there is arranged, in an assembly by means of horizontal articulations (4), a bearing structure (3) for a solar panel (9) formed by photovoltaic plates.

The support structure (2) is supported in a base (7), by means of a rotating coupling (6), while ties (5) which can be longitudinally regulated are arranged between the support structure (2) and the bearing structure (3) for the solar panel (9).

Therefore, by means of an automated drive of the rotation of the support structure (2) on the rotating coupling (6) with respect to the base (7) by means of a motor (8), the structural assembly (1) is capable of orientation rotation for tracking the sun in the azimuth direction, whereas, by means of the regulation of the longitudinal extension of the ties (5), the inclination position of the solar panel (9) can be varied, thus allowing adapting the solar tracker to the most suitable arrangement at each time and place in order to more effectively capture solar radiation.

Figure 2:
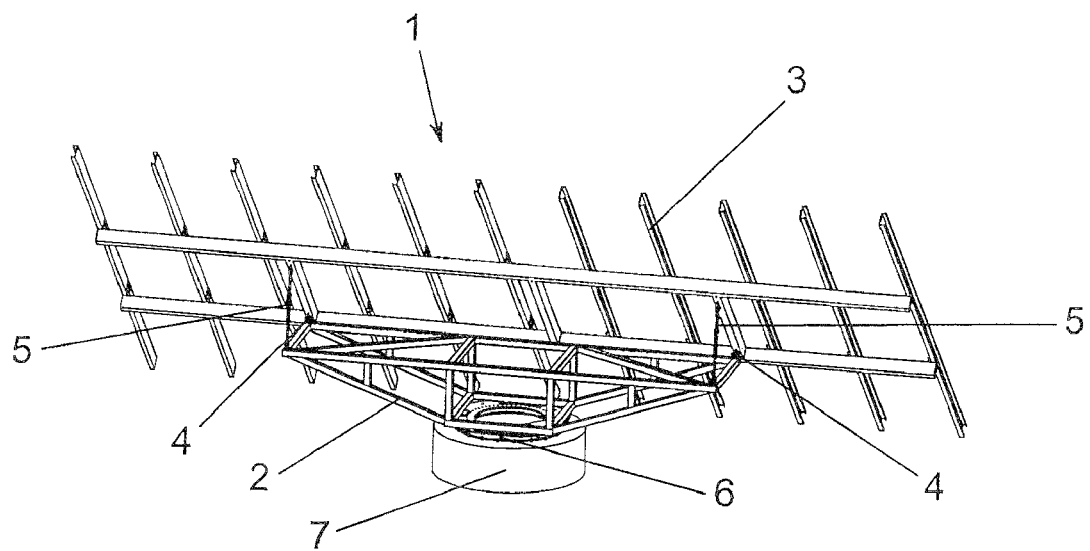
FIG. 2 depicts a perspective view from another observation angle of the same solar tracker of the previous figure.
Figure 3:
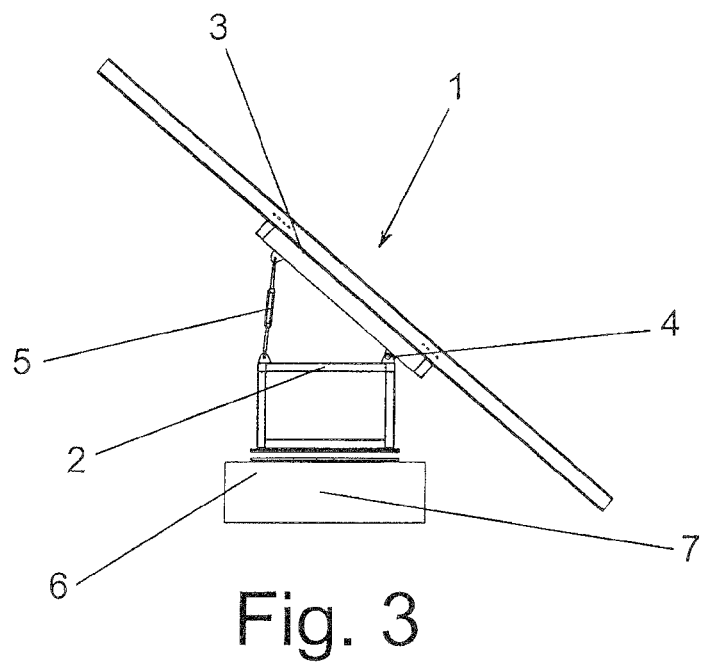
FIG. 3 depicts a profile view of the proposed solar tracker.
Figure 4:
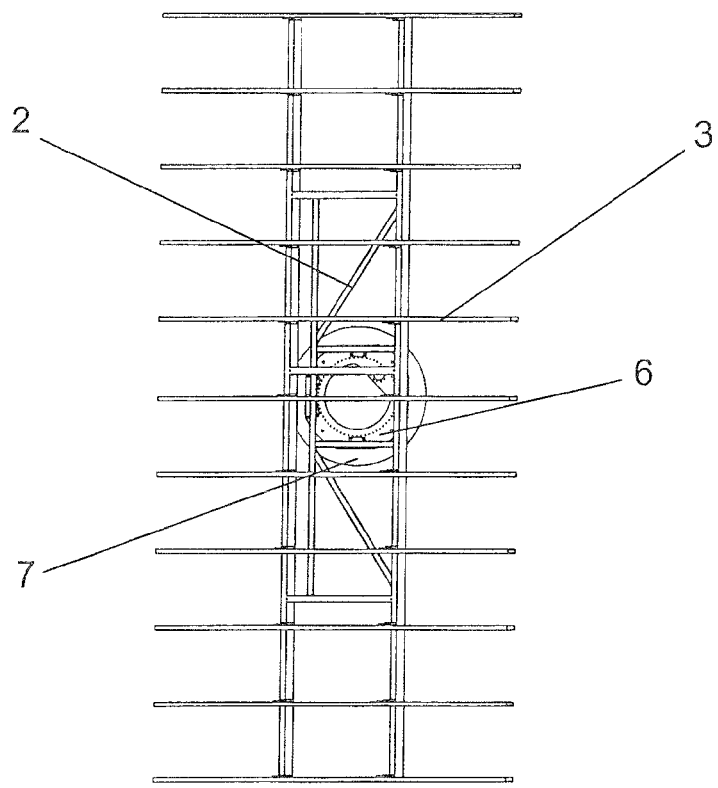
FIG. 4 is a plan view of this previous solar tracker.
Figure 5:
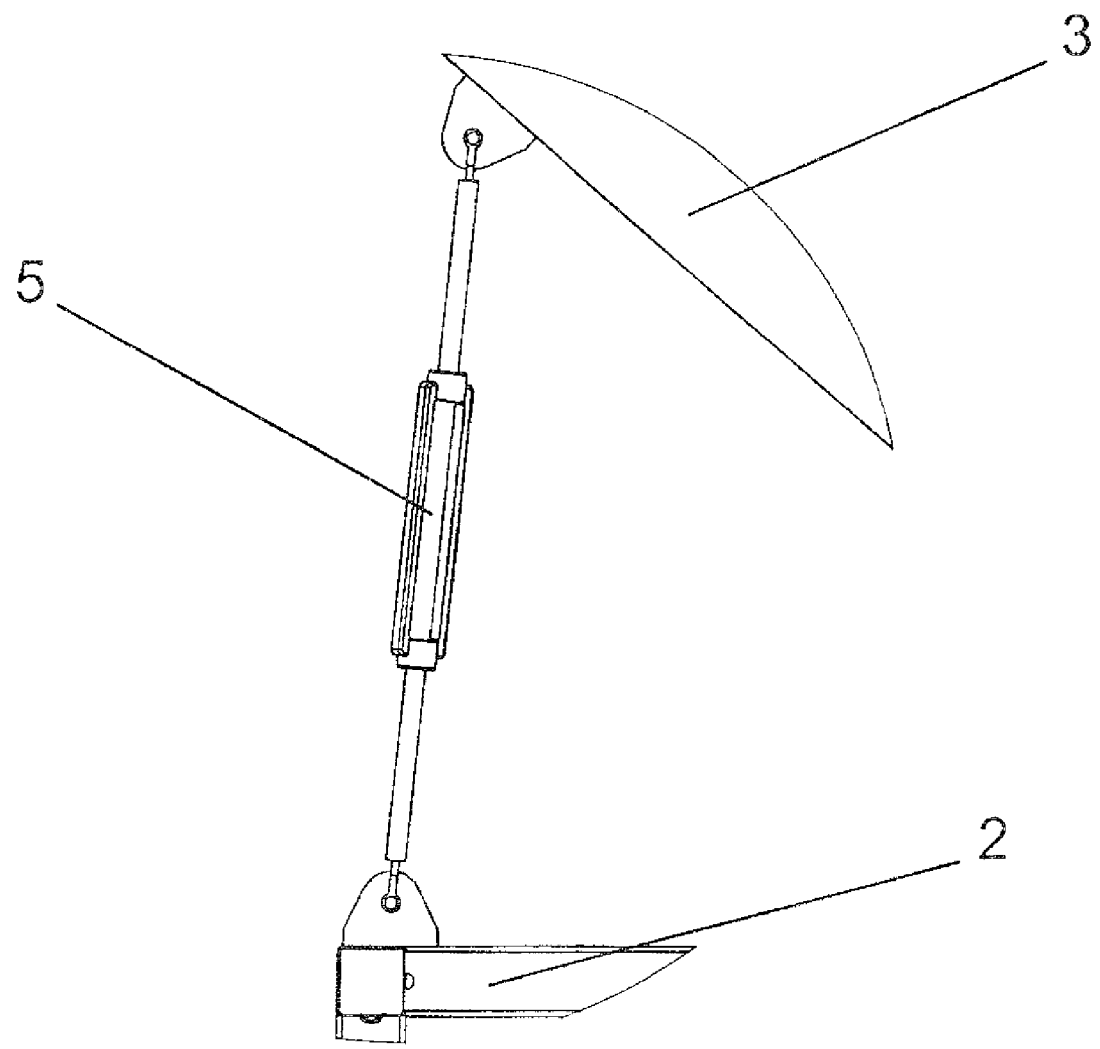
FIG. 5 shows a detailed view of a tie regulating the inclination of the solar panel of the solar tracker of the invention.
Figure 6:
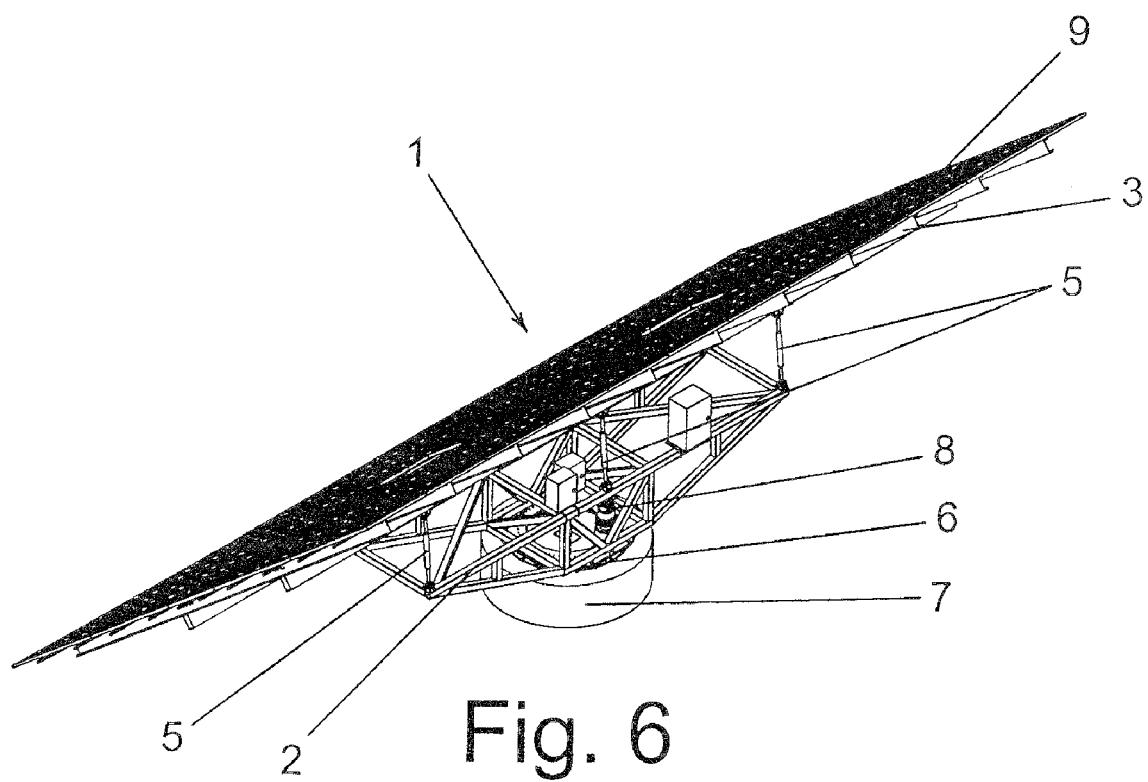
FIG. 6 depicts a perspective view of the proposed solar tracker in an embodiment with three ties regulating the inclination of the solar panel.

In an embodiment of the solar tracker, as observed in FIGS. 1 and 2, two ties (5) with a length which can be regulated are arranged between the support structure (2) and the bearing structure (3) of the solar panel (9), which ties are connected to the ends of the support structure (2); but without affecting the concept of the solar tracker according to the object of the invention, three ties (5) with a length which can be regulated can be arranged between the mentioned support structure (2) and the mentioned bearing structure (3) for the solar panel (9), two of such ties being connected to the ends of the support structure (2) and the third one being in the central area, as observed in FIG. 6.

With this arrangement, the ties (5) allow regulating the inclination of the solar panel (9), for example so that it ranges from 20 to 40 degrees with respect to the horizontal, allowing an increase of the energy production of the solar tracker between 20% to 25% with respect to the solar trackers which move according to an azimuth orientation rotation, but which incorporate the corresponding solar panel (9) in a fixed inclination position.

The invention claimed is:

1. A single-axis solar tracker comprising a structural assembly formed by a support structure on which a bearing structure for a solar panel is incorporated, the support structure being supported in a rotating assembly with respect to a vertical axis on a base, the support structure and the bearing structure for the solar panel are attached by horizontal articulations and by ties which longitudinally regulate the bearing structure, the ties selectively varying the inclination position of the bearing structure for the solar panel, wherein the ties are manually adjusted.

2. The single-axis solar tracker according to claim 1, wherein two ties which selectively vary the inclination position of the bearing structure are arranged between the support structure and the bearing structure for the solar panel, the ties are connected to the ends of the support structure.

3. The single-axis solar tracker according to claim 1, wherein three ties which selectively vary the inclination position of the bearing structure are arranged between the support structure and the bearing structure for the solar panel, two of the three ties being connected to the ends of the support structure and the third of the three ties connected in a central area.

* * * * *